US012365577B2

(12) United States Patent
Ichigaya

(10) Patent No.: US 12,365,577 B2
(45) Date of Patent: Jul. 22, 2025

(54) SPACER

(71) Applicant: SFT LABORATORY CO., LTD., Tokyo (JP)

(72) Inventor: Hiroshi Ichigaya, Tokyo (JP)

(73) Assignee: SFT LABORATORY CO., LTD., Tokyo (JP)

(*) Notice: Subject to any disclaimer, the term of this patent is extended or adjusted under 35 U.S.C. 154(b) by 33 days.

(21) Appl. No.: 18/009,630

(22) PCT Filed: Jun. 3, 2021

(86) PCT No.: PCT/JP2021/021220
§ 371 (c)(1),
(2) Date: Dec. 9, 2022

(87) PCT Pub. No.: WO2021/251269
PCT Pub. Date: Dec. 16, 2021

(65) Prior Publication Data

US 2023/0202830 A1 Jun. 29, 2023

(30) Foreign Application Priority Data

Jun. 12, 2020 (JP) ................................ 2020-101947

(51) Int. Cl.
*B68G 5/00* (2006.01)
*A41D 27/28* (2006.01)

(52) U.S. Cl.
CPC ................ *B68G 5/00* (2013.01); *A41D 27/28* (2013.01)

(58) Field of Classification Search
None
See application file for complete search history.

(56) References Cited

U.S. PATENT DOCUMENTS 8,129,013 B2 3/2012 Ichigaya
8,777,320 B2 * 7/2014 Stoll .................... B60N 2/5621 297/180.13
2002/0162173 A1 11/2002 Formenti
(Continued)

FOREIGN PATENT DOCUMENTS

CN 101811459 A 8/2010
JP H06289173 A 10/1994
(Continued)

OTHER PUBLICATIONS

International Search Report (ISR) (and English language translation thereof) dated Aug. 24, 2021, issued in International Application No. PCT/JP2021/021220.
(Continued)

*Primary Examiner* — Maria V Ewald
(74) *Attorney, Agent, or Firm* — Holtz, Holtz & Volek PC

(57) ABSTRACT

A spacer includes: projections each of which has a frame; multiple standing portions each of which has one end connected to the frame and that stand on the frame; and a standing-end connector that connects other ends of the standing portions, the frames being disposed close to each other such that the projections are connected; and flexible connectors that connect the frames. The projections have a three-dimensional shape. The flexible connectors are elastically deformable. At least either the projections or the flexible connectors have different shapes depending on a part of the spacer.

8 Claims, 8 Drawing Sheets

(56) References Cited

U.S. PATENT DOCUMENTS

| | | | | |
|---|---|---|---|---|
| 2008/0010753 | A1 | 1/2008 | Herandez | |
| 2015/0089750 | A1 | 4/2015 | Kertesz | |
| 2017/0105536 | A1 | 4/2017 | Ichigaya | |
| 2018/0064252 | A1 * | 3/2018 | Chin | A47C 7/14 |

FOREIGN PATENT DOCUMENTS

| | | | |
|---|---|---|---|
| JP | 2004202209 | A | 7/2004 |
| JP | 3140934 | U | 3/2008 |
| JP | 4067034 | B2 | 3/2008 |
| JP | 2010240258 | A | 10/2010 |
| JP | 2011245046 | A | 12/2011 |
| JP | 2020039522 | A | 3/2020 |
| TW | 200642630 | | 12/2006 |
| WO | 2015177887 | A1 | 11/2015 |

OTHER PUBLICATIONS

Written Opinion dated Aug. 24, 2021, issued in International Application No. PCT/JP2021/021220.

Japanese Office Action (and an English language translation thereof) dated Apr. 23, 2024, issued in counterpart Japanese Application No. 2020-101947.

Chinese Office Action (and an English language translation thereof) dated Jul. 16, 2024, issued in counterpart Chinese Application No. 202180041307.4.

International Preliminary Report on Patentability (IPRP) (and English language translation thereof) dated Dec. 13, 2022 issued in counterpart International Application No. PCT/JP2021/021220.

* cited by examiner

SPACER

TECHNICAL FIELD

The present invention relates to a spacer that has a space through which air flows in its three-dimensional structure.

BACKGROUND ART

There is known a spacer to be housed inside a fan-equipped garment or a fan-equipped mat to form a space through which air flows inside the garment or the mat (for example, see Patent Document 1).

As shown in FIG. 9A to FIG. 9D as an example, the spacer has a spacer structure S that includes projections S1 and flexible connectors S2. Each projection S1 has a frame S11; four pillars S12 each of which has one end connected to the frame S11 and that stand on the frame S11; and a standing-end connector S13 that connects the other ends of the four pillars S12. The flexible connectors S2 connect the frames S11 of adjacent projections S1.

The spacer having such a three-dimensional structure can be flexibly bent vertically or horizontally, and has an appropriate pressure resistance in its thickness direction. Such a spacer is ideal for flowing air in a relatively narrow space.

CITATION LIST

Patent Literature

Patent Document 1: JP4067034

SUMMARY OF THE INVENTION

Technical Problem

In applying spacers to wider usages, various demands for various usages have arisen recently. Such demands may not be sufficiently met by conventional spacers.

The inventors of the present invention have conceived a spacer that is easy to use for various applications as a result of intensive studies.

An object of the present invention is to provide a spacer that is applicable to various usages.

Solution to Problem

According to a first embodiment, a spacer includes: projections each of which has a frame, multiple standing portions each of which has one end connected to the frame and that stand on the frame, and a standing-end connector that connects other ends of the standing portions, the frames being disposed close to each other such that the projections are connected; and flexible connectors that connect the frames, wherein the projections have a three-dimensional shape, the flexible connectors are elastically deformable, and at least either the projections or the flexible connectors have different shapes depending on a part of the spacer.

The flexible connectors may have different levels of flexibility depending on a part of the spacer.

The flexible connectors may be formed in a curved shape so as to protrude toward the standing-end connector side, and each of the flexible connectors can have a level of flexibility corresponding to a curvature thereof.

Each of the flexible connectors can have a level of flexibility corresponding to a cross sectional shape thereof, the cross sectional shape crossing an extending direction in which the flexible connector extends.

The standing portions may be formed in different lengths depending on a part of the spacer, and the projections can have different heights depending on a part of the spacer.

The frame may be formed in a different size depending on a part of the spacer, and the projections can have different sizes depending on a part of the spacer.

The frame and/or the standing-end connector may be formed in different planar shapes depending on a part of the spacer, and the projections can have different external shapes depending on a part of the spacer.

The spacer may be constituted such that the projections that are arranged so as to form substantially concentric circles.

Advantageous Effects of Invention

According to the present invention, a spacer applicable to various usages is obtained.

DETAILED DESCRIPTION

Hereinafter, embodiments of the present invention will be described in detail with reference to the figures. The embodiments described below are provided with various limitations technically preferable for carrying out the present invention.

However, the scope of the present invention is not limited to the embodiments below or illustrated examples.

The spacer in the embodiments is used by being housed inside a fan-equipped garment, a fan-equipped mat, or the like to form a space through which air flows inside the garment/mat.

Embodiment 1

Figure 1A:
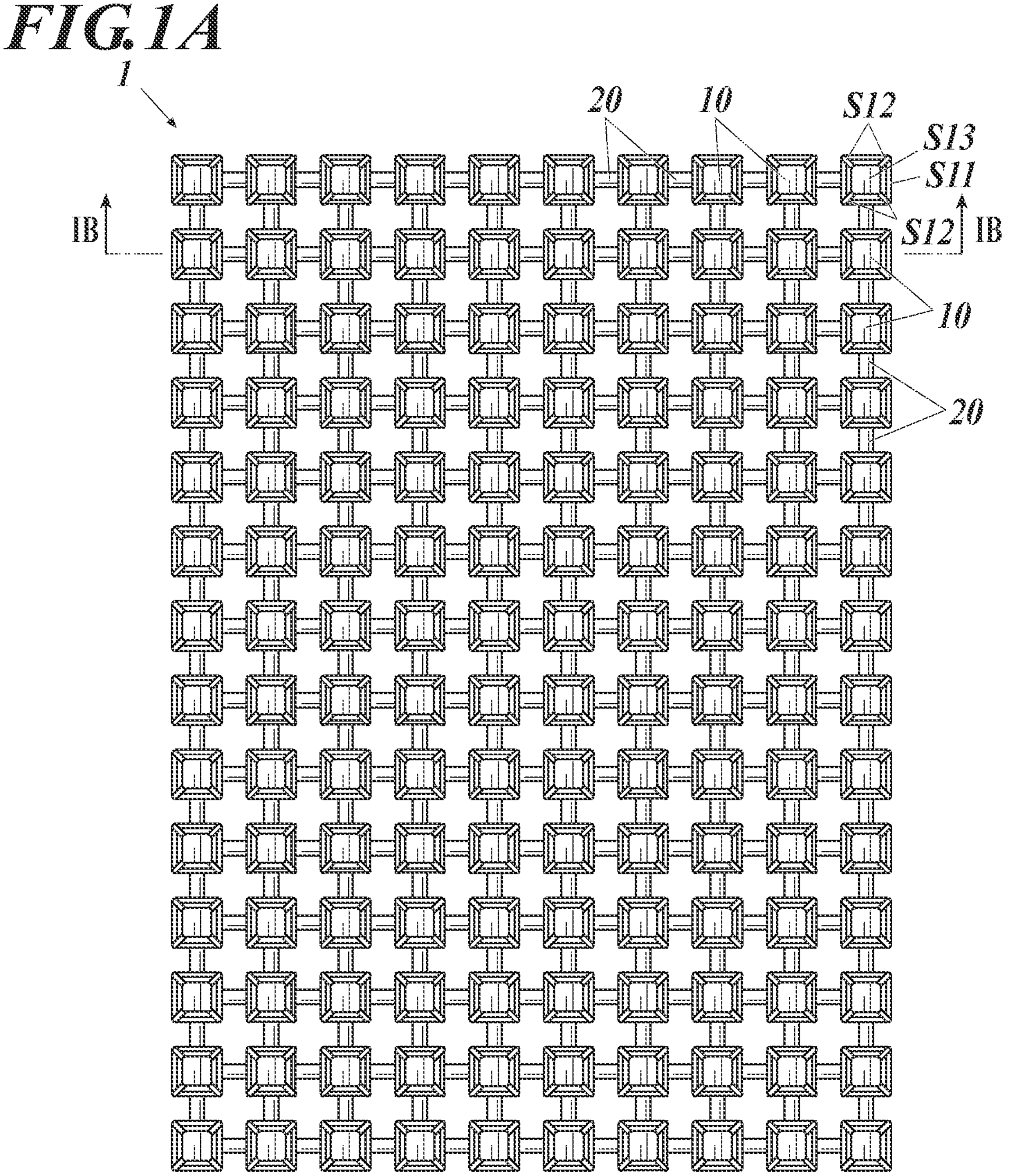
FIG. 1A is a plane figure of a spacer in an embodiment 1.
Figure 1B:
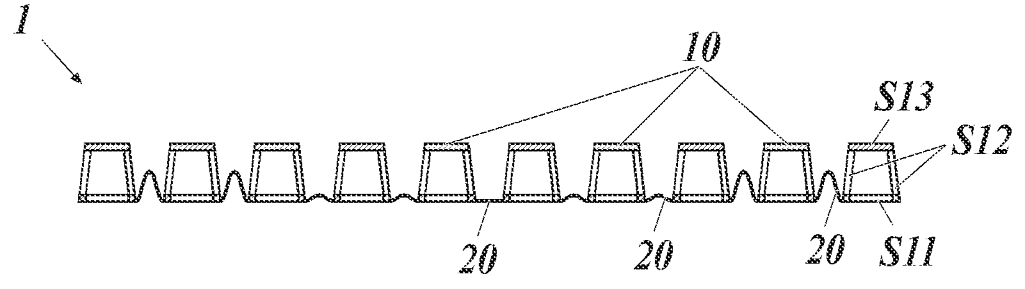
FIG. 1B is a cross section along the IB-IB line in FIG. 1A.

A spacer 1 in this embodiment includes projections 10 and flexible connectors 20, as shown in FIG. 1A and FIG. 1B as an example. Each of the projections 10 has a frame S11; multiple pillars S12 each of which has one end connected to the frame S11 and that stand on the frame S11; and a standing-end connector S13 that connects the other ends of the pillars S12. The frames S12 of the projections 10 are positioned close to each other so that the projections 10 can be connected. The flexible connectors 20 connect the frames S11 of the projections 10.

The spacer 1 in the embodiment 1 consists of multiple projections 10 arranged so as to form a matrix.

Figure 9A:
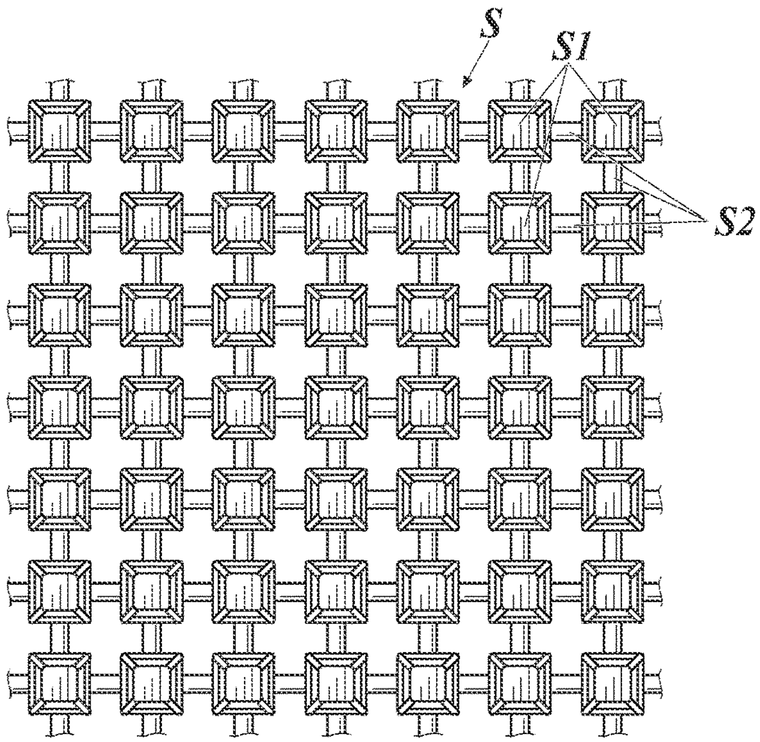
FIG. 9A is a plane figure of a conventional spacer.
Figure 9B:
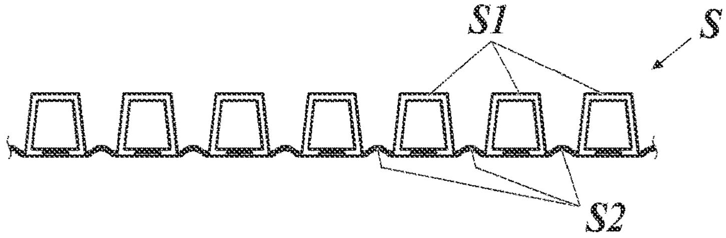
FIG. 9B is a lateral view of the conventional spacer.
Figure 9C:
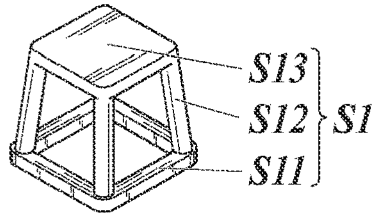
FIG. 9C is an explanatory figure related to the three-dimensional structure of the conventional spacer.
Figure 9D:
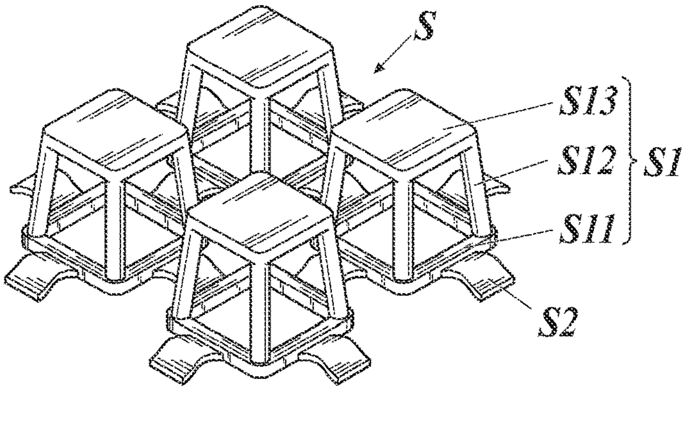
FIG. 9D is an explanatory figure related to the three-dimensional structure of the conventional spacer.

Each of the projections 10 has four pillars S12 as standing portions (see the projection S1 in FIG. 9C).

Each of the pillars S12 as the standing portions is formed so as to slant toward the central axis of the projection 10 as the pillar S12 is closer to the standing-end connector S13 from the frame S11.

The number of pillars S12 of the projection 10 is not limited to four. The projection 10 having three or more pillars S12 can appropriately keep its three-dimensional shape.

The standing portions are not limited to the bar-shaped pillars S12 but may be planar walls disclosed in the Patent document 1.

The frames S11 of the spacer 1 have a square frame shape. The frames S11 may have a polygonal shape, such as a triangular, pentagonal, or hexagonal shape. The frames **S1*l*** may also be round or oval.

The standing-end connectors S13 of the spacer 1 have a flat shape to connect other ends of the pillars S12. The standing-end connectors S13 may have a frame shape or a ring shape to connect other ends of the pillars S12.

The flexible connectors 20 of the spacer 1 are belt-shaped and put between the frames S11 of the projections 10 such that each of the flexible connectors 20 extends from one projection 10 to another projection 10.

The flexible connectors 20 are belt-shaped and thinner than the frames **S1*l*, so that the spacer 1 easily bends at the flexible connectors S2. Thus, the spacer 1** is configured to be flexible.

The flexible connectors 20 may be bar-shaped and thinner than the frames S11, so that the spacer 1 easily bends at the flexible connectors S2. Such a structure also allows the spacer 1 to be flexible.

The material of the spacer 1 may be determined as desired as long as the material is strong enough to support the three-dimensional structure of the projections 10 (e.g., strong enough to avoid the collapse of the projections 10). It is preferable that the material have a certain level of strength but the material be not too hard. For example, the material may be polyethylene (PE) or more flexible elastomer (TPE). However, the material is not limited to a specific one.

The spacer 1 has a structure in which multiple projections 10 are connected by the flexible connectors 20. According to this structure, the spacer 1 can be formed in a desired size by changing the number of projections 10 connected by the flexible connectors 20.

Specifically, the flexible connectors 20 of the spacer 1 are formed to have different shapes depending on the part of the spacer 1. The flexible connectors 20 are elastically deformable and have different levels of flexibility depending on the part of the spacer 1.

Herein, the flexible connectors 20 are formed in a curved shape so as to protrude from the frame S11 side toward the standing-end connector S13 side. Each of the flexible connectors 20 has a level of flexibility corresponding to its curvature.

More specifically, the flexible connectors 20 on the outside in the width direction of the spacer 1 have greater curvatures than the flexible connectors 20 on the central part, as shown in FIG. 1B. The greater the curvature of a flexible connector 20 is, the more easily the flexible connector 20 bends and elastically deforms. The flexible connectors 20 in the central column in the width direction of the spacer 1 have a flat belt shape and are not curved.

That is, the spacer 1 more easily bends at its outside part than at its central part in the width direction. Thus, the spacer 1 is more flexible at its both ends in the width direction.

Such a spacer 1 can be appropriately applied to various usages, such as a mat to be used with its both ends bent or a mat that is easily bent at its both ends.

In the spacer 1 described above as an example, the flexible connectors 20 on the outer part in the width direction have greater curvatures than the flexible connectors 20 on the central part. However, the flexible connectors 20 on the central part in the width direction may have greater curvatures than the flexible connectors 20 on the outer part.

Such a spacer can be appropriately applied to a mat that is bent at its central part when used or a mat that is easily bent at its central part and easily folded.

Naturally, in the spacer 1, the flexible connectors 20 on the outer part in the length direction may have greater curvatures than the flexible connectors 20 on the central part; or the flexible connectors 20 on the outer part in both the width and length directions may have greater curvatures.

In the spacer 1, the flexible connectors 20 may be arranged such that the curvature becomes gradually greater from one end toward the other end in the width direction (or in the length direction).

Thus, the orders and arrangements of the flexible connectors 20 having different curvatures may be determined as desired and may be appropriately designed according to the usage of the spacer 1.

The present invention is not limited to the above embodiment.

Figure 2A:
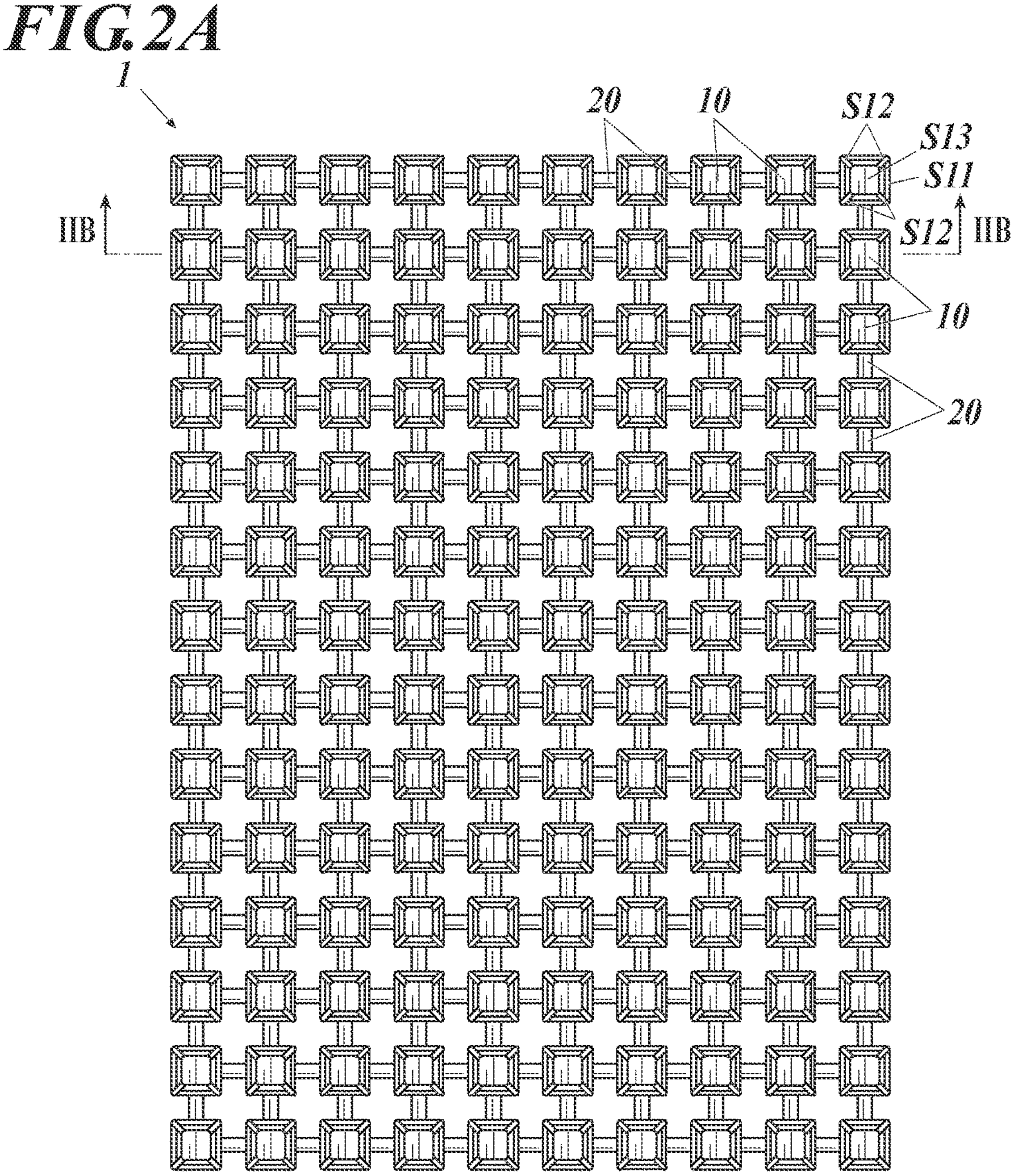
FIG. 2A is a plane figure of the spacer in the embodiment 1.
Figure 2B:
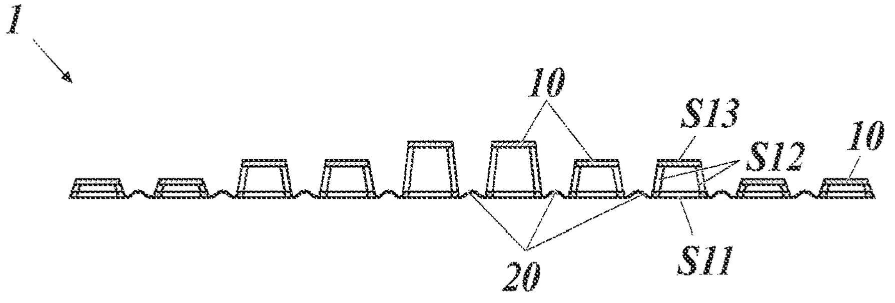
FIG. 2B is a cross section along the IIB-IIB line in FIG. 2A.

For example, the projections 10 of the spacer 1 shown in FIG. 2A and FIG. 2B are formed to have different shapes depending on the part of the spacer 1, and the three-dimensional projections 10 have different heights depending on the part of the spacer 1.

Herein, the pillars S12 as the standing portions of the projections 10 are formed to have different lengths depending on the part of the spacer 1, so that the projections 10 have different heights depending on the part of the spacer 1.

More specifically, as shown in FIG. 2B, the projections 10 on the outer part in the width direction of the spacer 1 have shorter pillars S12 than the projections 10 on the central part. The shorter the pillars S12 are, the lower the projection 10 is.

That is, in the spacer 1, the projections 10 on the outer part in the width direction are lower than the projections 10 on the central part. The spacer 1 therefore becomes thinner toward its both ends in the width direction.

Such a spacer 1 can be appropriately applied to various usages, such as a mat that becomes thicker toward its both ends or a mat that flows more air in its central part in the width direction.

In the spacer 1 described above as an example, the projections 10 on the outer part in the width direction are lower than the projections 10 on the central part. However, in the spacer 1, the projections 10 on the central part in the width direction may be lower than the projections 10 on the outer part.

Such a spacer can be appropriately applied to a mat that becomes thinner toward its central part, a mat that is bent at its central part when used, a mat that flows more air in its both ends in the width direction, and so forth.

Naturally, lower projections 10 may be arranged on the outer part than on the central part in the length direction of the spacer 1; or the lower projections 10 may be arranged on the outer part in both the width and length directions.

The projections 10 having different heights may be arranged in the spacer 1 such that the spacer 1 gradually becomes thinner from one end toward the other end in the width direction (or in the length direction).

Thus, the orders and arrangements of the projections 10 having different heights may be determined as desired, and may be appropriately designed according to the usage of the spacer 1.

The present invention is not limited to the above embodiment.

Figure 3:
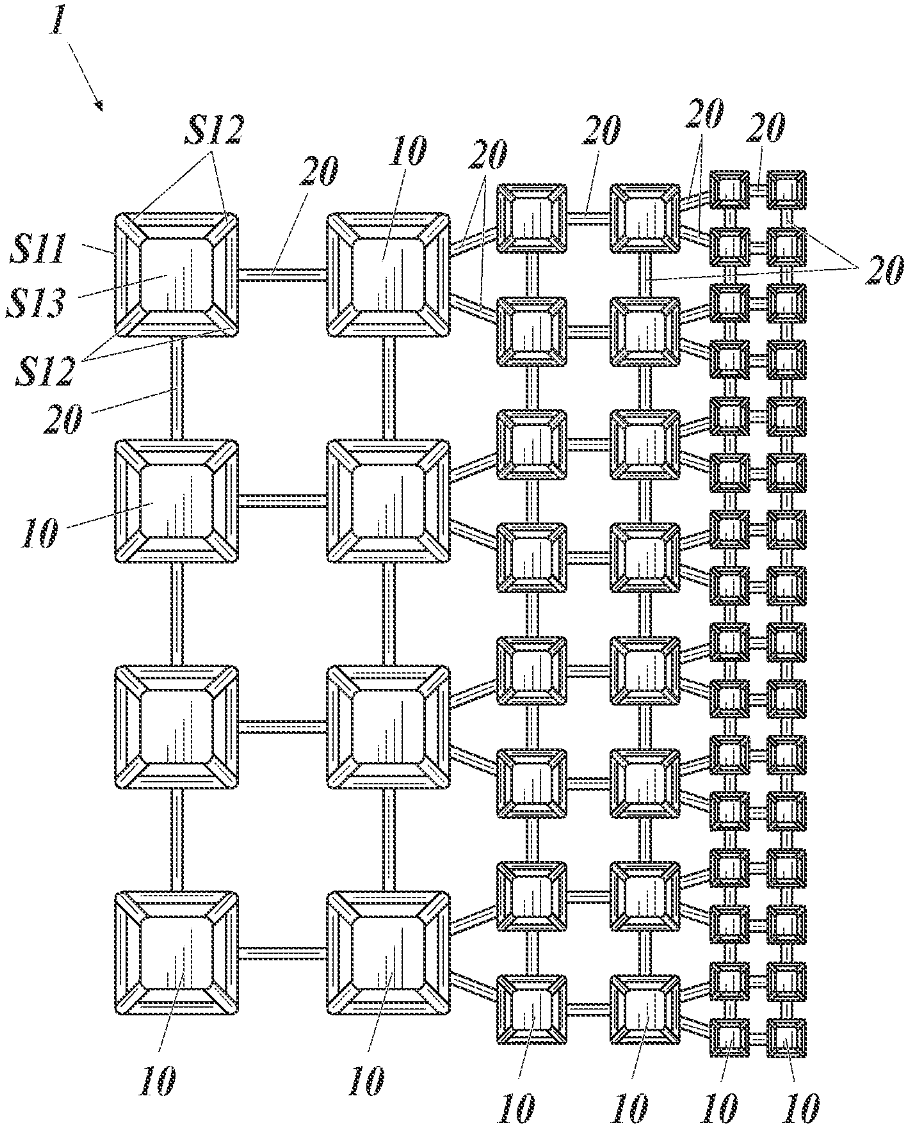
FIG. 3 is a plane figure of a modification of the spacer in the embodiment 1.

For example, the projections 10 of the spacer 1 shown in FIG. 3 are formed to have different shapes depending on the part of the spacer 1, and the three-dimensional projections 10 have different sizes depending on the part of the spacer 1.

Herein, the frames S11 of the projections 10 are formed to have different sizes depending on the part of the spacer 1, so that the projections 10 have different sizes depending on the part of the spacer 1.

More specifically, in FIG. 3, the frames S11 on the right side in the width direction of the spacer 1 are smaller than the frames S11 on the left side. The smaller the frame S11 is, the smaller the projection 10 is.

That is, in the spacer 1 in FIG. 3, the projections 10 on the right side in the width direction are made smaller than the projections 10 on the left side. Therefore, the spacer 1 has a finer structure in its right side in the width direction.

Such a spacer 1 can be appropriately applied to various usages, such as a mat having a softer texture on its either end in the width direction, a mat having a higher density texture on its either end in the width direction, and so forth.

In FIG. 3, the projections 10 on the right side in the width direction are made smaller than the projections 10 on the left side. Herein, the projections 10 having different sizes may have the same height.

The projections 10 having different sizes and having the same height may be formed by making the length of the pillars S12 uniform while varying the sizes of the frames S11.

Naturally, the spacer 1 may be constituted of the projection parts 10 having heights corresponding to sizes of their frames S11. That is, the three-dimensional shapes of the projections 10 may be taller for larger frames S11 and may be shorter for smaller frames S11.

The levels of flexibility of the flexible connectors 20 may be varied depending on the part of the spacer 1.

For example, in FIG. 3, the flexible connector 20 connected to a relatively larger projection 10 may be relatively thicker, whereas the flexible connector 20 connected to a relatively smaller projection 10 may be relatively thinner. Thus, the level of flexibility of the flexible connector 20 can be adjusted according to the part of the spacer 1. The thinner the flexible connector 20 is, the more easily the flexible connector 20 bends.

Thus, the level of flexibility of the flexible connector 20 can be adjusted by adjusting the cross-sectional shape of the flexible connector 20 (the cross-sectional shape that crosses the extending direction of the flexible connector 20), such as the thickness of the flexible connector 20.

The levels of flexibility of the flexible connectors 20 may be substantially uniform regardless of the part of the spacer 1.

The present invention is not limited to the above embodiment.

Figure 4:
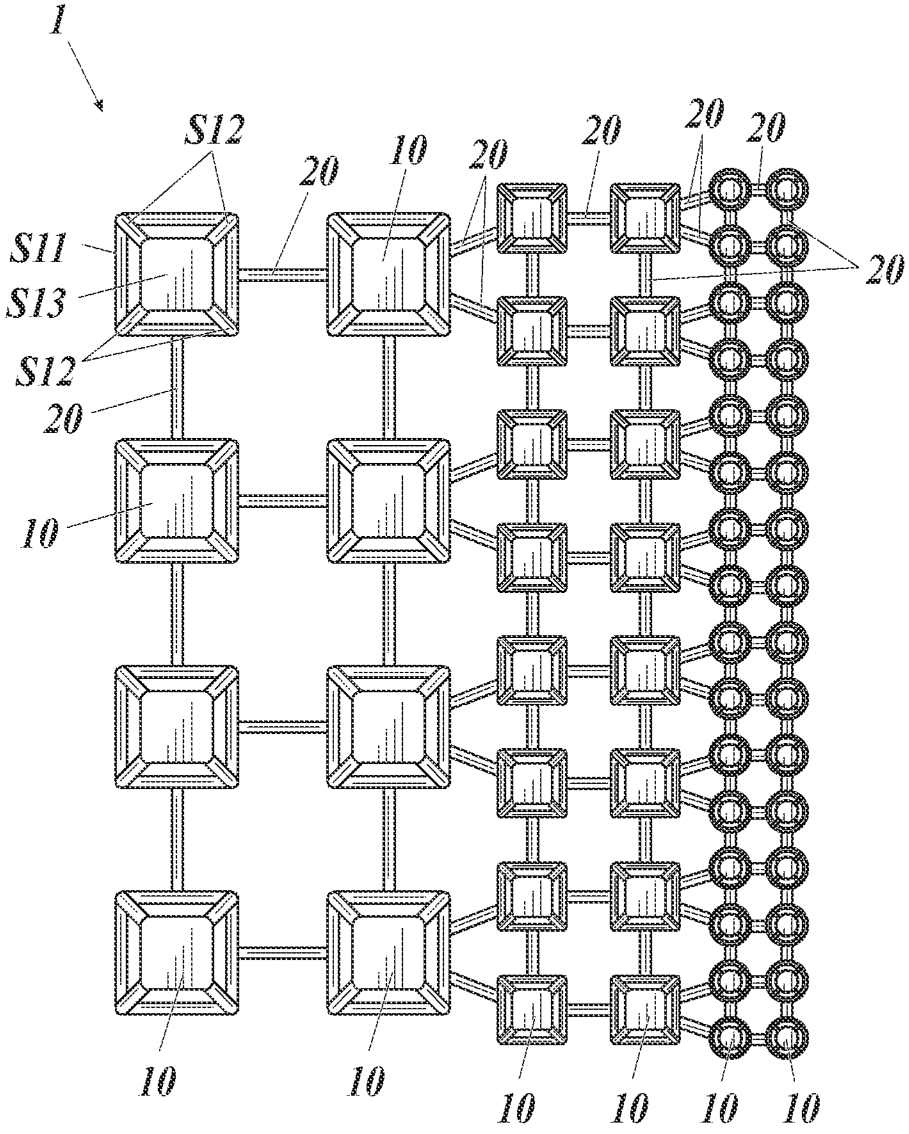
FIG. 4 is a plane figure of a modification of the spacer in the embodiment 1.

For example, in the spacer 1 shown in FIG. 4, the frames S11 and standing-end connectors S13 of the projections 10 have different planar shapes depending on the part of the spacer 1, and the three-dimensional projections 10 have different external shapes depending on the part of the spacer 1.

In FIG. 4, the projections 10 in the left four columns have frames S11 and standing-end connectors S13 that are substantially rectangular in a plane figure; and the projections 10 in the right two columns have frames S11 and standing-end connectors S13 that are substantially round in a plane figure.

More specifically, as shown in FIG. 4, the projections 10 in the left four columns have a substantially truncated square pyramid shape, whereas the projections 10 in the right two columns have a substantially truncated cone shape.

Such a spacer 1 that consists of projections 10 having different external shapes connected by the flexible connectors 20 can also be applied to various usages.

In the spacer 1 exemplified in the figure, the projections 10 in the left four columns have a substantially truncated square pyramid shape; the projections 10 in the right two columns have a substantially truncated cone shape; and the projections 10 become smaller toward the right end in the figure. Alternatively, the projections 10 in the left two columns may have a substantially truncated cone shape; the projections 10 in the right four columns may have a substantially truncated square pyramid shape; and the projections 10 may become smaller toward the right end in the figure.

Thus, the orders and arrangements of the projections 10 having different external shapes and sizes may be determined as desired, and may be appropriately designed according to the usage of the spacer 1.

The spacer exemplified herein is formed by connecting projections 10 each having (i) a substantially rectangular frame S11 and a substantially rectangular standing-end connector S13 or (ii) a substantially round frame **S1*l* and a substantially round standing-end connector S13. However, the spacer may be formed by connecting projections 10 each having (i) a substantially rectangular frame S11 and a substantially round standing-end connector S13 or (ii) a substantially round frame S11 and a substantially rectangular standing-end connector S13**.

Embodiment 2

Next, an embodiment 2 of the spacer according to the present invention is described. The aspects that are the same as the embodiment 1 are denoted by the same reference numerals, and only the aspects different from the embodiment 1 are described.

Figure 5A:
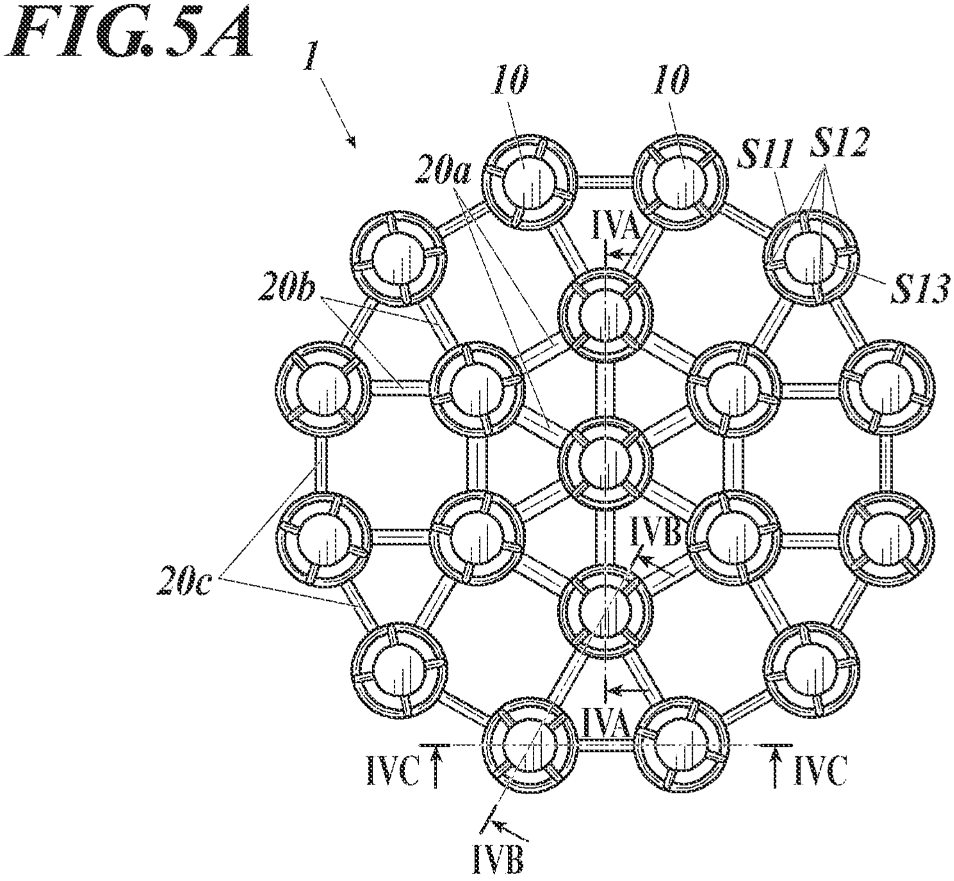
FIG. 5A is a plane figure of the spacer in an embodiment 2.
Figure 5B:
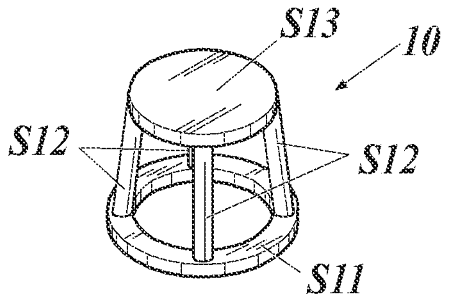
FIG. 5B is a perspective view of a projection of the spacer in the embodiment 2.

The spacer 1 in this embodiment includes projections 10 and flexible connectors 20 (20*a*, 20*b*, and 20*c*), as shown in FIG. 5A and FIG. 5B as an example. Each of the projections 10 has a frame S11; multiple pillars S12 each of which has one end connected to the frame S11 and that stand on the frame S11; and a standing-end connector S13 that connects the other ends of the pillars S12. The frames S11 of the projections 10 are disposed close to each other so that the projections 10 can be connected. The flexible connectors 20 connect the frames S11 of the projections 10.

The spacer 1 in the embodiment 2 consists of multiple projections 10 that are arranged so as to substantially form concentric circles.

Each of the projections 10 of the spacer 1 has the ring-shaped frame S11, four pillars S12 as standing portions, and the round standing-end connector S13, as shown in FIG. 5A and FIG. 5B.

Figure 5C:
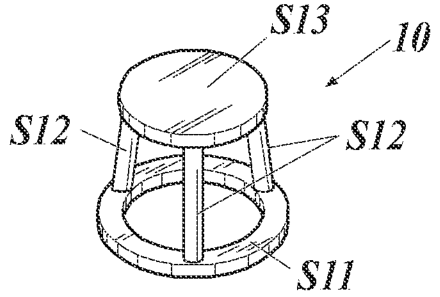
FIG. 5C is a perspective view of a modification of the projection of the spacer in the embodiment 2.
Figure 6A:
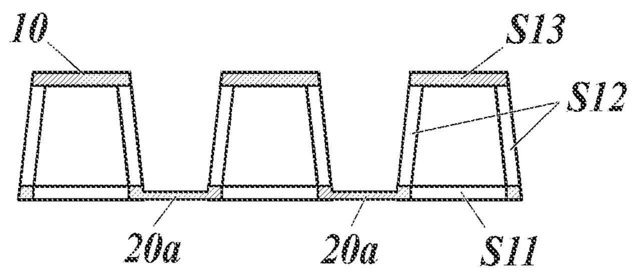
FIG. 6A is a cross section along the IVA-IVA line in FIG. 5A.
Figure 6B:
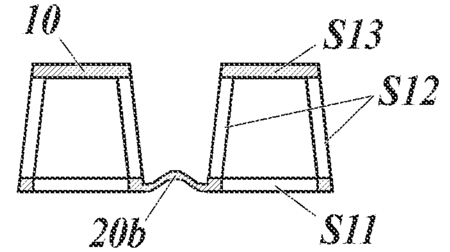
FIG. 6B is a cross section along the IVB-VB line in FIG. 5A.
Figure 6C:
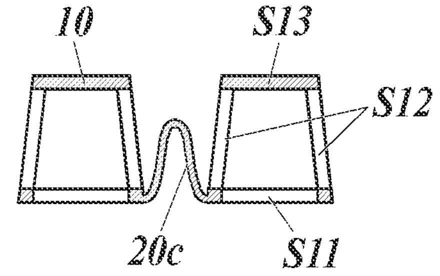
FIG. 6C is a cross section along the IVC-VC line in FIG. 5A.

As shown in FIG. 5C, the projection 10 having at least three pillars S12 can appropriately keep its three-dimensional shape.

In the spacer 1 shown in FIG. 5A, six projections 10 are arranged around the central projection 10, and twelve projections 10 are arranged around the six projections 10. Thus, the projections 10 are connected such that two concentric circles are formed around the central projection 10.

For example, as shown in FIG. 5A, the central projection 10 and its surrounding six projections 10 are connected by wide-width belt-shaped flexible connectors 20*a*; the outer-end twelve projections 10 are connected by narrow-width belt-shaped flexible connectors 20*c*; and the outer-end projections 10 are connected to the inside projections 10 by medium-width belt-shaped flexible connectors 20*b*.

Thus, the level of flexibility of the flexible connector 20 can be adjusted by adjusting the cross-sectional shape of the flexible connector 20 (the cross-sectional shape that crosses the extending direction of the flexible connector 20), such as the thickness of the flexible connector 20, For example. The narrower the flexible connector 20 is, the more easily the flexible connector 20 bends.

In particular, in this embodiment, the central projection 10 and its surrounding six projections 10 are connected by flat-belt shaped flexible connectors 20*a* that are not curved; the outer-end twelve projections 10 are connected by belt-shaped flexible connectors 20*c* that have a relatively large curvature; and the outer-end projections 10 are connected to the inside projections 10 by belt-shaped flexible connectors 20*b* that have a relatively small curvature.

That is, in the spacer 1, the flexible connectors 20 at the outer end have a greater curvature so as to bend more easily than the flexible connectors 20 on the central part. Thus, the outer end of the spacer 1 elastically deforms more easily.

Figure 7:
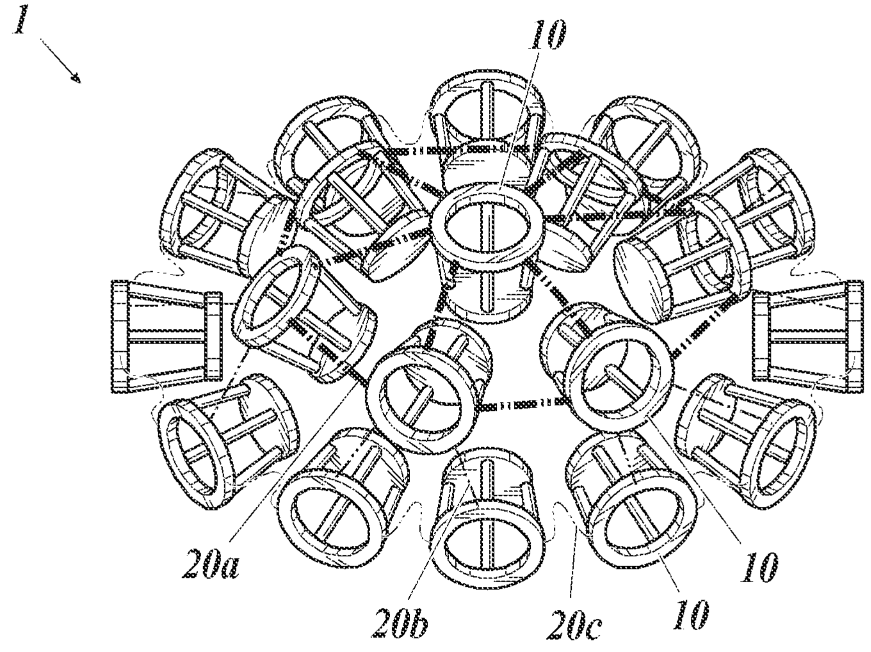
FIG. 7 is a perspective view of the bent spacer in the embodiment 2.

Such a spacer 1 that elastically deforms more easily at its outer end than at its central part can be bent into a curved shape so as to form a substantially spherical surface, as shown in FIG. 7.

Such a spacer 1 can be appropriately applied to various usages, such as a mat to be set on a bowl-shaped depressed seat.

The number of concentric circles formed of connected projections 10 may be determined as desired and may be appropriately designed according to the usage of the spacer 1.

Naturally, the orders and arrangements of the flexible connectors 20 may be determined as desired and may be appropriately designed according to the usage of the spacer 1.

Figure 8A:
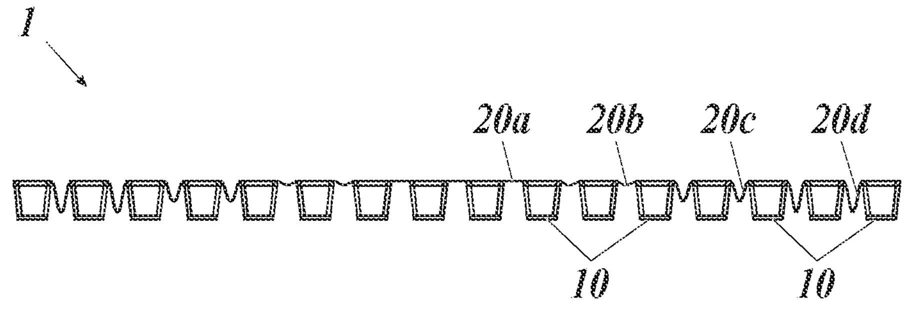
FIG. 8A is a cross section of a modification of the spacer in the embodiment 2.

For example, the spacer 1 in which multiple projections 10 are arranged and connected by the flexible connectors 20 so as to form concentric circles may be configured as shown in FIG. 8A. In FIG. 8A, the projections 10 in the central part are connected by not-curved flexible connectors 20*a*; the outside projections 10 are connected by flexible connectors 20*b* having a relatively small curvature; and the further outside projections 10 are connected by flexible connectors 20*c* having a greater curvature than the inside flexible connectors 20*b*; and the outer end projections 10 are connected by flexible connectors 20*d* having a greater curvature than the inside flexible connectors 20*c*.

Such a spacer 1 is also easily deformed elastically at its outer end side.

Figure 8B:
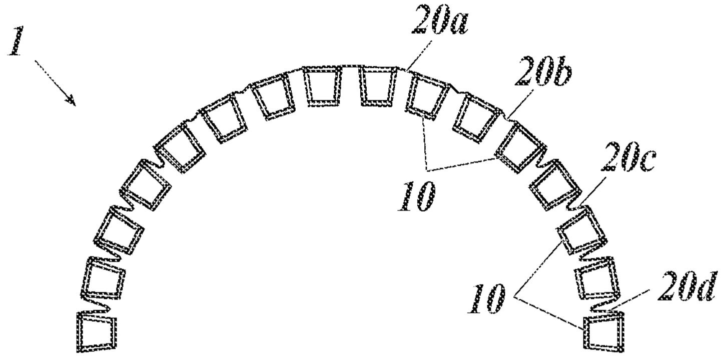
FIG. 8B is a cross section of the bent spacer in the embodiment 2.

Such a spacer 1 can be bent into a substantially hemispherical shape, as shown in FIG. 8B as an example.

Figure 8C:
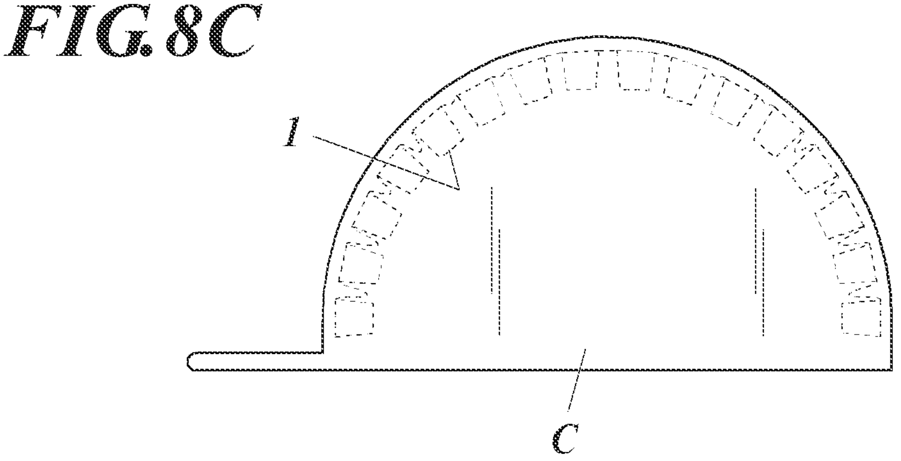
FIG. 8C is to explain a usage example of the spacer in the embodiment 2, wherein the bent spacer is attached to a cap.

Such a spacer 1 that can be bent into a substantially hemispherical shape can be attached inside a cap C, as shown in FIG. 8C as an example.

The cap C provided with the substantially hemispherical shaped spacer 1 can secure a space through which air flows between the cap C and the head of the wearer. Thus, the cap C can prevent the head of the wearer from becoming sweaty.

In the above embodiment 2, all the projections 10 of the spacer 1 are illustrated and described as having the same shape. However, the present invention is not limited to this. The projections 10 arranged in the spacer 1 may have different sizes, heights, and/or external shapes.

For example, regarding the spacer 1 that is used by being attached inside the cap C, the spacer 1 may be designed such that the projections 10 become gradually lower and smaller toward the edge region of the cap C (specifically, toward the outer end of the spacer 1) from the parietal region of the cap C. This can prevent the inside of the cap C from becoming sweaty without decreasing comfortableness of the cap C.

As described above, the spacer 1 in this embodiment can be applied to various usages by appropriately designing the shapes and arrangement patterns of the projections 10 and flexible connectors 20.

In the above embodiments, the spacer 1 is formed in a flat shape and is bent when used. However, the present invention is not limited to these embodiments. The spacer 1 may be originally formed in a bent shape.

In such a case, the spacer may be created by a three-dimensional (3D) printer or the like on the basis of 3D data of a preferable shape or a preferable placement pattern of the spacer inside the cap C, the 3D data being designed with a three-dimensional computer aided design (CAD). The 3D data may be unfolded into two-dimensional flat data to create a metal mold for forming the spacer, and the spacer formed by the mold may be assembled into a 3D shape.

It is preferable that the density of the spacer 1 be 30% or less with respect to the spatial volume of the spacer 1.

It is preferable that the frames S1*l* and the flexible connectors 20 be formed such that the area of openings where the frames S11 and the flexible connectors 20 are not formed accounts for 50% to 95% of the entire surface area of the spacer 1 on which the frames S11 are formed.

Naturally, detailed configurations and so forth can be appropriately modified.

INDUSTRIAL APPLICABILITY

The present invention is applicable to a spacer that can be used in various ways.

| REFERENCE SIGNS LIST | |
|---|---|
| 1 | Spacer |
| 10 | Projection |
| 20 | Flexible connector |
| 20a, 20b, 20c, 20d | Flexible connector |
| S11 | Frame |
| S12 | Pillar (standing portion) |
| S13 | Standing-end connector |
| C | Cap |

The invention claimed is:

1. A spacer comprising:

a plurality of projections, each of the projections including:

a frame;

multiple standing portions, each of the standing portions having one end connected to the frame, and the standing portions standing on the frame; and a standing-end connector that connects other ends of the standing portions; and flexible connectors that connect the frames, wherein:

the spacer is configured to form a space through which air flows, each of the projections has a three-dimensional shape, the frames of the projections are disposed close to each other so as to be connected by the flexible connectors, the flexible connectors are elastically deformable, the flexible connectors are formed in a curved shape so as to protrude toward the standing-end connector side, and the flexible connectors have different levels of flexibility at different parts of the spacer.

2. The spacer according to claim 1, wherein the level of flexibility of each of the flexible connectors depends on a curvature thereof.

3. The spacer according to claim 1, wherein the level of flexibility of each of the flexible connectors depends on a cross sectional shape thereof, the cross sectional shape crossing an extending direction in which the flexible connector extends.

4. The spacer according to claim 1, wherein:

at least one of (i) the frames and (ii) the standing-end connectors have different planar shapes at different parts of the spacer, and the projections have different external shapes at different parts of the spacer.

5. The spacer according to claim 1, wherein the projections are arranged so as to form substantially concentric circles.

6. The spacer according to claim 1, wherein:

the standing portions have different lengths at different parts of the spacer, and the projections have different heights at different parts of the spacer.

7. The spacer according to claim 1, wherein:

the frames have different sizes at different parts of the spacer, and the projections have different sizes at different parts of the spacer.

8. The spacer according to claim 6, wherein:

the frames have different sizes at different parts of the spacer, and the projections have different sizes at different parts of the spacer.

* * * * *